US008075278B2

(12) United States Patent
Zuteck

(10) Patent No.: US 8,075,278 B2
(45) Date of Patent: Dec. 13, 2011

(54) SHELL STRUCTURE OF WIND TURBINE BLADE HAVING REGIONS OF LOW SHEAR MODULUS

(76) Inventor: Michael D. Zuteck, Clear Lake Shores, TX (US)

( * ) Notice: Subject to any disclaimer, the term of this patent is extended or adjusted under 35 U.S.C. 154(b) by 399 days.

(21) Appl. No.: 12/470,405

(22) Filed: May 21, 2009

(65) Prior Publication Data

US 2010/0296940 A1    Nov. 25, 2010

(51) Int. Cl.
*F01D 5/18* (2006.01)
(52) U.S. Cl. ............... 416/233; 416/146 R; 416/223 R; 416/226; 416/232
(58) Field of Classification Search ............. 416/223 R, 416/225, 226, 229 R, 233, 241 R, 146 R
See application file for complete search history.

(56) References Cited

U.S. PATENT DOCUMENTS

| 5,499,904 | A * | 3/1996 | Wallace et al. ............... 416/230 |
| 2008/0206062 | A1* | 8/2008 | Sanz Pascual et al. ....... 416/226 |
| 2009/0140527 | A1* | 6/2009 | Pawar et al. ................... 290/55 |
| 2009/0196751 | A1* | 8/2009 | Jacobsen et al. ........... 416/146 R |
| 2010/0008789 | A1* | 1/2010 | Jensen ......................... 416/233 |
| 2010/0068065 | A1* | 3/2010 | Jensen ....................... 416/241 R |
| 2010/0092300 | A1* | 4/2010 | Jensen et al. ................ 416/233 |
| 2010/0135818 | A1* | 6/2010 | Babu et al. ................... 416/226 |
| 2010/0143142 | A1* | 6/2010 | Akhtar ......................... 416/226 |
| 2010/0143146 | A1* | 6/2010 | Bell et al. ..................... 416/233 |
| 2010/0296941 | A1* | 11/2010 | Zuteck ........................ 416/226 |
| 2011/0052407 | A1* | 3/2011 | Zuteck ..................... 416/241 R |
| 2011/0052408 | A1* | 3/2011 | Zuteck ..................... 416/241 R |
| 2011/0142662 | A1* | 6/2011 | Fritz et al. ................... 416/226 |
| 2011/0142669 | A1* | 6/2011 | Althoff et al. ............ 416/229 R |

* cited by examiner

*Primary Examiner* — Michael Lebentritt
(74) *Attorney, Agent, or Firm* — David McEwing

(57) ABSTRACT

The torsional rigidity of a wind turbine blade affects the twist response of the blade induced by bending moments within the blade. By including regions having a lower modulus of rigidity than the remainder of the blade shell, the torsional rigidity of the blade shell can be decreased, and the twist response thereby increased. In blades having a single shear web, this twist response may be more pronounced. The regions of low modulus may comprise additional shell panels, or thick regions of low modulus joining material.

20 Claims, 5 Drawing Sheets

SHELL STRUCTURE OF WIND TURBINE BLADE HAVING REGIONS OF LOW SHEAR MODULUS

BACKGROUND OF THE INVENTION

1. Field of the Invention

The invention is directed generally to wind turbine blade design.

2. Description of the Related Art

Wind turbine blades are comprised of shells and other structural components which may be thickest near the base, or root, of the blade. The thickness of these components causes the blade roots to be very resistant to twisting when torsion is applied at the root. In certain wind turbine blades, blade performance can be improved when twisting of the blade is induced via aerodynamically generated bending moments, with larger amounts of twist being desirable in some embodiments. The amount of twist that can be induced is partially dependent on the shear stiffness of the blade at various locations along the length of the blade. If the rigidity of portions of the blade is reduced, particularly at portions of the blade located closer to the root, the sweep response of the blade may be increased.

SUMMARY OF THE INVENTION

In one aspect, a wind turbine blade is provided, including a blade shell including at least a first shell section, a second shell section, and an intermediate shell section extending between the first shell section and the second shell section, and a stiffening structure disposed between the first shell section and the second shell section, where the intermediate shell section includes a material having a lower modulus of rigidity than the first shell section and the second shell section.

In another aspect, a wind turbine blade is provided, including a blade shell, including a first shell panel, and a second shell panel, where at least a portion of an edge of the first shell panel is configured to slidably interact with at least a portion of an edge of the second shell panel to reduce the torsional stiffness of the blade shell, and a stiffening structure disposed between the first shell panel and the second shell panel.

DETAILED DESCRIPTION OF EMBODIMENTS

Figure 1:
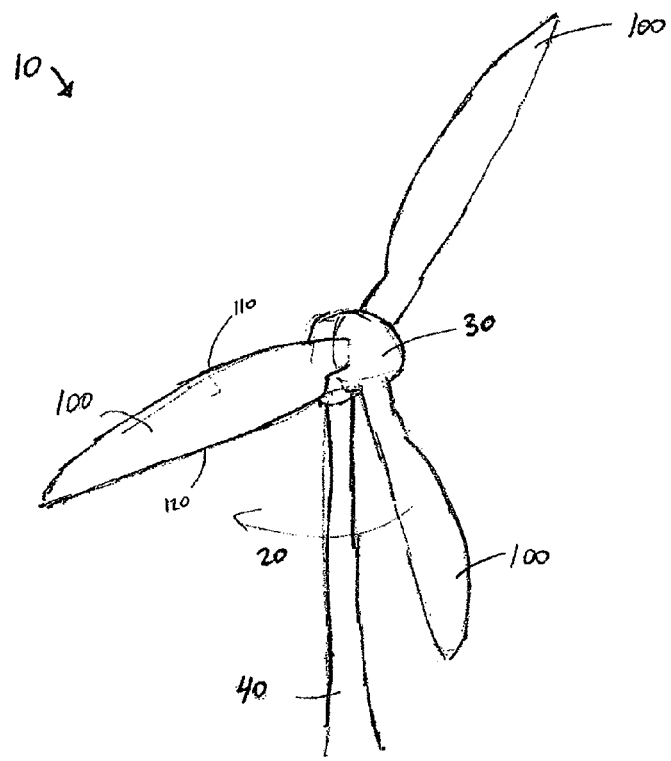
FIG. 1 is a perspective view of a wind turbine comprising three wind turbine blades.

FIG. 1 depicts an exemplary wind turbine 10 comprising three wind turbine blades 100 extending radially from a wind turbine hub 30 mounted on a tower 40. The wind turbine rotates in a direction 20, such that a leading edge 110 of a blade 100 and a trailing edge 120 are oriented as shown in FIG. 1.

Figure 2:
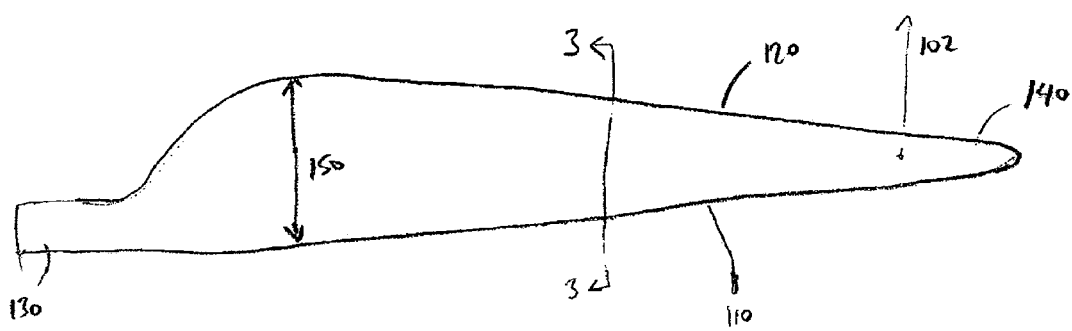
FIG. 2 is a top plan view of a wind turbine blade.

FIG. 2 is a top plan view of an exemplary wind turbine blade 100 of FIG. 1. The chord length of the blade is measured from the leading edge 110 to the trailing edge 120 within a twisting plane whose outer part lies near the plane of rotation of the blade 100 in its full power setting. This chord length initially increases as the distance from a blade root 130 increases, until reaching a maximum chord length 150, and then decreases towards a tip 140 of the blade.

The outer surfaces of typical modern wind turbine blades, also referred to herein as shells, are composed of an inner skin, an outer skin, and a stabilizing core. Typically, these skins run from the leading edge, or nose, of the blade to the trailing edge, or tail, of the blade, so that the need to cut or join fabrics at an intermediate point is minimized, simplifying the construction of the blade. These skins thus typically provide constant mechanical properties, such as the shear modulus of the skin, along their widths. For large blades, fabric widths are typically inadequate to span the whole inner blade chord, so overlap of skin fabrics along spanwise joining lines is typical for blades of sufficient size.

Figure 3:
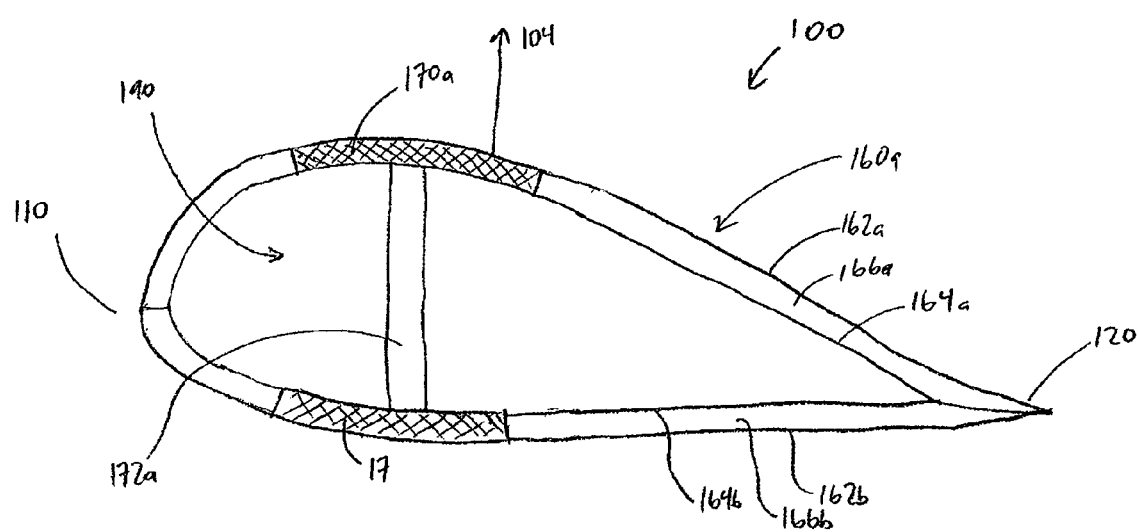
FIG. 3 is a cross-sectional view of the wind turbine blade of FIG. 2 taken along the line 3-3 of FIG. 2.

FIG. 3 is an illustration of an exemplary cross-section of the blade 100 of FIG. 2, taken along the line 3-3 of FIG. 2. The blade 100 comprises an upper shell 160a and a lower shell 160b, and an interior stiffening structure comprising spar caps 170a and 170b and shear web 172 located between the upper and lower shells. As noted above, the shells 160a and 160b are composite structures. In particular, shell 160a comprises an outer skin 162a, an inner skin 164a, and a core 166a located therebetween. The outer and inner skins 162a and 164a may comprise fiberglass or another suitable material in an appropriate thickness. The particular thickness and properties of the outer and inner skins 162a and 164a may vary significantly in various embodiments.

The interior stiffening structure comprises the pair of spar caps 170a and 170b extending adjacent the inner skins 164a and 164b of the upper and lower shells, and extending part of the length of the shells, and a shear web 172 extending between the spar caps 170a and 170b. In the illustrated embodiment, the spar caps 170a and 170b are disposed between the inner skin and the outer skin of the shells adjacent sections of the core. In such an embodiment, the skins may be formed over the spar caps and the core sections to form shells 160a and 160b, and the shells may then be assembled to form a blade. In an alternate embodiment, however, the shells may be formed without the spar caps, such that the outer skin is brought into contact with the inner skin, leaving a gap between the core sections where a spar cap or box spar can later be placed.

In the illustrated embodiment, the single shear web 172 extends between the spar caps 170a and 170b to form essentially an I-beam structure. In certain embodiments, some or all of the spar caps 170a and 170b and the shear web 172 comprise a high performance material such as carbon fiber, although these structural members may comprise multiple materials at different locations within the structural members.

In alternate embodiments, turbine blades may comprise more than one shear web extending between the upper and lower spar caps to form a generally box-shaped structure which may provide additional rigidity, and the embodiments described herein are capable of being used with such a structure. However, the single shear web illustrated above may provide mechanical characteristics, such as lowered torsional resistance, which may be advantageous in certain embodiments such as when the turbine blade utilizes sweep-twist coupling to improve performance.

When installed on a turbine, the turbine blade 100 may be subjected to a variety of loads. Power producing torque, drag forces and gravitational forces may act predominantly within the plane of rotation, subjecting the turbine blade to in-plane bending, also referred to as edgewise bending. This edgewise bending will result in deformation, typically in the direction of rotation, such as in the direction illustrated as 102 in FIG. 2, thereby causing the blade to bend, or sweep, in a forward direction. Power producing torque generally dominates over air drag, and the net effect of gravity will average to zero when the blade is rotating. Resistance to edgewise bending is generally provided by the shell structure of the blade.

The turbine blade may also be subjected to loads acting out of the plane of rotation, such as the force of wind acting on the facing surface of the blade, as well as the lift generated by air flow past the blade. These forces will result in flapwise bending of the turbine blade out of the plane of rotation, such as in direction 104 of FIG. 3. Resistance to flapwise bending is generally provided by the beam structure formed by the shear web(s) 172 and spar caps 170a,b. although some shear is also carried by the nose and trailing edge paths.

When a turbine blade 100 is swept in an aft direction 102, away from leading edge 110, a bending moment is created which induces twist in the blade. The degree to which the induced twist will affect the overall twist of the blade is dependent on both the resistance to applied torsional forces and the location at which a given amount of twist is induced. To the extent that twist can be induced in the interior section of the blade 100, near the root 130, the twist induced there may affect all portions of the blade outward of that section, thereby affecting nearly the entire blade. However, the torsional resistance of the root of a turbine blade 100 may be very high, reducing the amount of twist which can be induced in that region. The turbine blade 100 may have a substantially cylindrical shape at the root, and may comprise very thick layers of material in order to provide the necessary strength to support the blade, particularly given the edgewise and flapwise loads acting on the blade. This thick shell material will typically provide high torsional stiffness near the root section of the blade, as the shell may provide the bulk of the torsional resistance especially when a single shear web is used. Other sections closer to the root of the blade may also comprise thicker shell material than the sections located nearer the tip of the blade. The sections of the blade near the root, which have a long chord length and a thickness which is still close to the thickness at the root, may also be torsionally very stiff.

In certain embodiments, a turbine blade such as the turbine blade 100 may be modified to include regions of low modulus of rigidity in the shell, in order to lower the torsional stiffness of the shell and increase the twist response of the blade. In particular, it may be desirable to lower the torsional stiffness of the blade within the inboard region of the blade to the extent possible, as doing so will have a more global effect on the overall twist of the blade than modifications elsewhere. Generally, this may be accomplished by introducing regions of low elasticity into the blade shell.

FIGS. 4 and 5A through 5D illustrate an alternate blade design comprising a flattened trailing edge which may be modified to include a region of low shear modulus. As can be seen in the top plan view of FIG. 4, the blade 200 comprises a leading edge 210, a trailing edge 220, a root 230, and a tip 240. The blade 200 differs from the blade 100 of FIGS. 1-3 in that the trailing edge 220 comprises a substantially flat portion 225 extending generally orthogonal to the plane of rotation of the blade 200, best seen in FIGS. 5A-5D.

Figure 4:
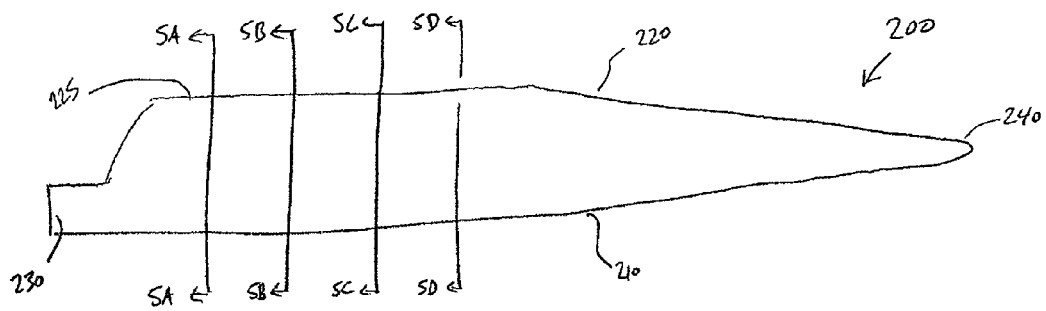
FIG. 4 is a top plan view of an alternative wind turbine blade comprising a flat section along the trailing edge.
Figure 5A:
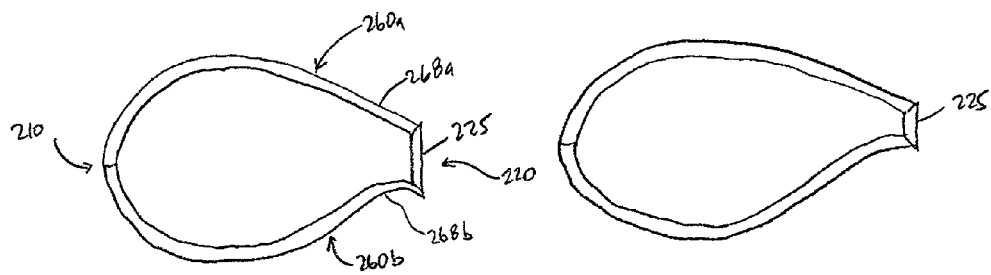
FIGS. 5A-5D are cross-sectional views of the alternative wind turbine blade of FIG. 4, each view taken along the line designated with numbers corresponding to the associated Figure number.

The flat trailing section 225 is most pronounced near the root of the blade, as can be seen in FIG. 5A, which is a cross-sectional view of the airfoil of blade 200 taken along line 5A-5A of FIG. 4, located at roughly 15% of the radius of blade 200 from the root 230. It can be seen that the blade 200 is not merely a truncated version of blade 100, but that the blade 200 is rather configured to provide desired aerodynamic properties, in that the aft region 268b of lower shell 260b tapers upward and then back downward in a direction which is substantially parallel to the aft region 268a of upper shell 260a. In certain embodiments, the trailing section 225 may be substantially flat as shown, but in other embodiments may have some degree of convex or concave curvature.

Figure 5B:
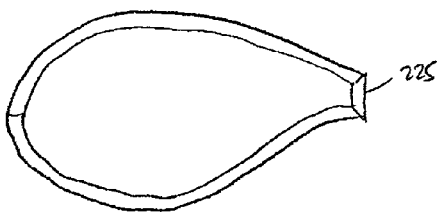
Figure 5C:
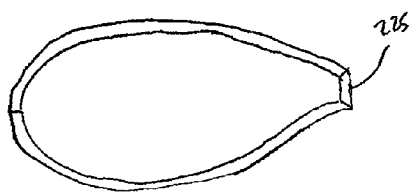
Figure 5D:

The height of the flat trailing section 225 decreases as it moves away from the blade root 230 and toward tip 240, as can be seen in FIG. 5B, which is a cross-sectional view of the airfoil of blade 200 taken along line 5B-5B of FIG. 4, located at roughly 25% of the radius of blade 200, and in FIG. 5C, which is a cross-sectional view of the airfoil taken along line 5C-5C, which is located at roughly 35% of the blade radius. At line 5D-5D, roughly 45% of the blade radius, the airfoil of the blade is shown in FIG. 5D, and it can be seen that the flat trailing section 225 is much smaller than at locations closer to the blade root. The flat trailing section 225 ends at a location outboard of the line 5D-5D, beyond which location the upper shell 260a is joined directly to the lower shell 260b along the trailing edge.

In some embodiments, the flat trailing section 225 may comprise a material having a lower shear stiffness, reducing the overall torsional stiffness of the blade shell. In certain embodiments, this may be accomplished by using a thinner layer of some or all of the materials included in the remainder of the blade shell. For example, in embodiments in which all or a portion of the remainder of the blade shell comprises a composite layer such as those discussed above, the trailing section 225 may be formed from a single layer of the material used to form the inner or outer skin of the composite shell, or may be formed by utilizing thinner versions of some or all of the layers in the composite shell. Thus, in certain embodiments, the torsional stiffness of a section of a turbine blade may be reduced by providing a section with a layer of thinner material than that used in the remainder of the blade.

In certain other embodiments, the trailing section 225 may comprise a different material than that used elsewhere in the remainder of the shell, in order to reduce the overall stiffness of the blade shell. Because the trailing section 225 is a discrete portion of the blade 200, materials which would ordinarily have an insufficient stiffness to weight ratio to be utilized in blade shells may be utilized to form the discrete trailing section 225. In certain embodiments, the trailing section may comprise a material such as Dacron or nylon, although a wide variety of other suitable materials may be used.

By including a region of low shear stiffness such as trailing section 225, the torsional stiffness of sections of the blade 200 may be reduced. The twist induced by a given bending moment will thus be increased. The increase in twist may be more effective if the low shear stiffness region is near the root 230 of the blade 200. In embodiments in which the blade 200 includes a single shear web, rather than more than one shear web, the single shear web may provide a smaller amount of resistance against blade twist, further increasing the twist response of the blade. To the extent that additional resistance against bending is required, the stiffness of the shear web or spar caps, particularly in embodiments comprising only a single shear web, may be increased to provide a greater amount of bending stiffness and a less significant increase in the torsional stiffness of the blade.

In alternate embodiments, the low shear stiffness zones may be located elsewhere in the blade shell. Because the spar caps may be generally thicker and/or stiffer than the blade shell material, the practicality of including a section of low shear stiffness in a portion of the blade shell lying adjacent a spar cap may be limited, as the buckling stability of the region may be adversely altered to an unacceptable degree. However, another suitable region which can be made of a lower shear modulus material is the forward panel of the blade, particularly at or adjacent the leading edge. In particular, the front stagnation point, typically located on the high pressure shell just below the leading edge, may be an optimal location for placement of such a low shear modulus zone. Because of the inclusion of a low shear modulus zone, the shape of the airfoil will undergo an alteration when under load, due to movement of a portion of the blade shell relative to another portion of the blade shell. When this alteration to the shape is located near a stagnation zone, the effect on the aerodynamics of the blade will be minimized. However, placement of such a low shear stiffness zone in locations other than the front stagnation zone may also be effective at decreasing torsional resistance, and are not excluded.

Figure 6:
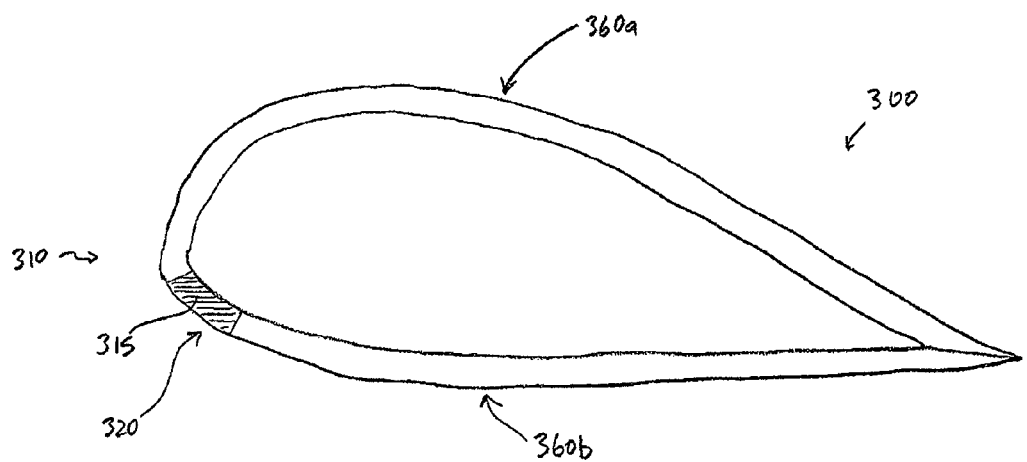
FIG. 6 is a cross-sectional view of an embodiment of a wind turbine blade having a region of low modulus along the leading edge of the blade, taken at a location between the root region and the tip region of the blade.

FIG. 6 is a cross-section of an embodiment of a blade 300 comprising a leading section 315 located slightly below the leading edge 310 of the blade, wherein the leading section 315 is formed from a material having a lower shear modulus than the remainder of the blade, so as to provide a region with lower shear stiffness. The leading section 315 in the illustrated embodiment is slightly below the leading edge 310 of the blade, near the front stagnation zone 320. In other embodiments, a region of lower shear stiffness may be provided by using a thinner layer, as discussed above.

In the illustrated embodiment, the leading section 315 is joined to both the upper shell 360a and the lower shell 360b, and comprises a curved member having a lower modulus than portions of the upper shell 360a and the lower shell 360b. The lower shell 360b will be exposed to higher pressure during operation than the upper shell 360a, and may be alternately referred to as the high pressure shell, while the upper shell 360b may be referred to as the low pressure shell.

In particular embodiments, the leading section 315 may have sufficient stiffness to generally retain a curved shape when the blade is under load, in order to provide a leading edge having desired aerodynamic properties. In other embodiments, however, the airfoil may not comprise a continuous curve across the leading section 315 as shown, and the leading section 315 may comprise a member having a different amount of curvature than the adjacent sections of the upper and lower shells, to provide either a flatter, less-curved shape extending between the leading edges of the upper and lower shells or a shape with greater curvature than the adjacent portions of the upper and lower shells. Because the leading edge 310 is formed by a part of the upper shell 360a, the shape of the blade at the leading edge will undergo less distortion than if the leading section 315 extended through the leading edge 310. The lack of significant deformation at the leading edge 310 preserves the desired aerodynamic properties of the blade. In certain embodiments, this leading section may comprise a layer of material which overlaps the stiffer material of the remainder of the blade shells by a short distance. In other embodiments, this leading section may comprise a distinct panel sealed to the forward edges of the upper and lower blade shells.

The use of a low shear modulus zone near or at the leading edge of the blade will alter the torsional stiffness of the blade in a similar manner as that discussed above with respect to trailing sections having a lower shear stiffness. Due to the location of the low shear stiffness zone near the leading edge of the blade, however, the reduction in stiffness and potential for corresponding changes in shape and other aerodynamic properties of the low shear stiffness zone at or near the leading edge of the blade may have more of an effect on blade performance than a low shear stiffness zone located near the trailing edge. The linear velocity at which a section of the blade moves during operation will increase towards the tip of the blade 300. Accordingly, the aerodynamic properties of a section of the blade adjacent the root may thus be less critical than the aerodynamic properties of a blade section farther from the root, as the sections near the root will move at a lower linear velocity.

In certain embodiments, low shear stiffness regions may extend only a portion of the length of the blade, as discussed above, or may extend along all or substantially all of the length of the blade. As the net effect on overall blade twist caused by blade twist near the tip of the blade may be less than that caused by blade twist near the root of the blade, low shear stiffness zones which begin at or near the root of the blade and extend along only a portion of the blade length may provide a desired balance between an increase in twist due to a decrease in torsional stiffness and the resultant reduction in blade stiffness.

Figure 7:
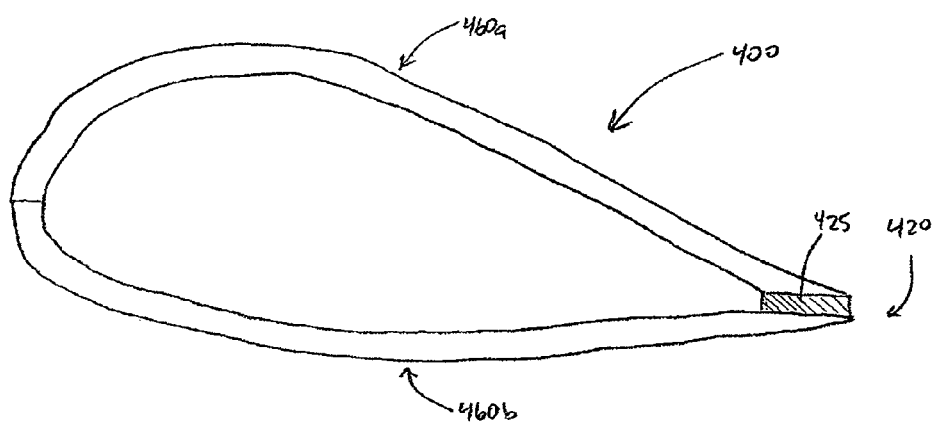
FIG. 7 is a cross-sectional view of an embodiment of a wind turbine blade having a thick bond between the upper and lower shell in the trailing edge of the blade, taken at a location between the root region and the tip region of the blade.

In alternate embodiments, the torsional stiffness of the blade may be modified through the use of other materials to join the upper and lower blade shells, rather than through the modification of the shell material or design to include additional shell sections. FIG. 7 illustrates a cross section of an exemplary blade 400 which comprises an upper shell 460a and a lower shell 460b. At the trailing edge 420, a thick bond layer 425 joins the upper shell 460a and lower shell 460b together. In ordinary turbine blades, this bond layer may comprise a substantially rigid adhesive with a high modulus of rigidity, such as an epoxy, so that the upper shell 460a is unable to move significantly relative to the lower shell 460b, as the epoxy will be able to bear a larger shear stress without significant shear strain. In the embodiment of FIG. 7, however, the upper shell 460a and lower shell 460b may be joined together using an adhesive which has a modulus of rigidity which is significantly less than a conventional adhesive used in turbine blade manufacturing. In certain embodiments, the adhesive may have a modulus of elasticity that is less than 10% that of a typical epoxy adhesive used in turbine blades. In a particular embodiment, a PLEXUS™ methacrylate adhesive may be used to form the thick bond layer 425. In particular embodiments, the thick bond layer may have a modulus of rigidity of less than 100 ksi, but materials having a larger or smaller modulus of rigidity may also be used in various embodiments.

Because the adhesive within the bond layer 425 has a lower modulus of rigidity than typical adhesives used to join turbine blade sections, an applied shear force will result in significantly greater strain, such that the upper shell 460a may move relative to the lower shell 460b at the trailing edge 420 of blade 400. This reduction in torsional stiffness allows the twist response of the blade to be improved. By increasing the thickness of the bond layer 425, the potential displacement of the layers relative to one another is increased, increasing the possible twist response of the blade. Thus, the twist response of the blade can be increased either by increasing the thickness of the bond layer 425 or by utilizing an adhesive with a lower modulus of rigidity.

Figure 8:
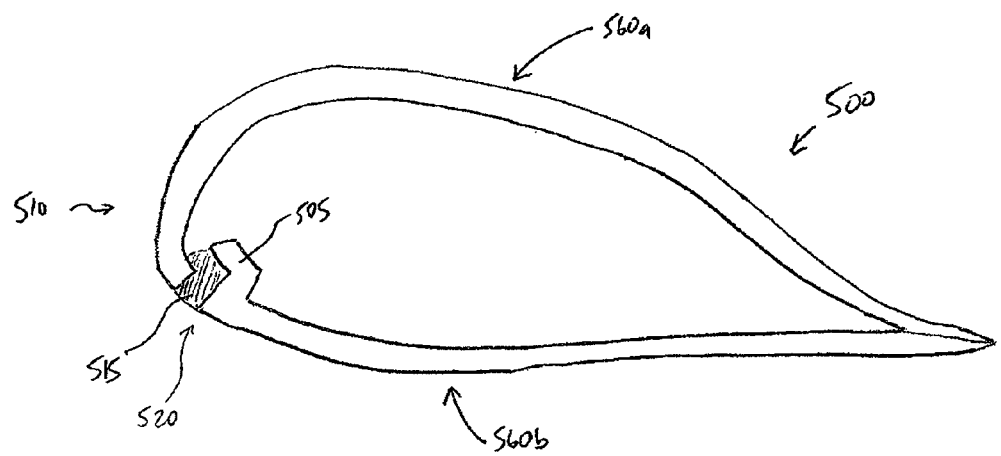
FIG. 8 is a cross-sectional view of an embodiment of a wind turbine blade having a thick bond between the upper and lower shell in the leading edge of the blade, taken at a location between the root region and the tip region of the blade.

In other embodiments, such a low shear stiffness joining layer can be used at the leading edge joint between the upper and lower shells. FIG. 8 illustrates a cross-section of another blade 500 which comprises a thick adhesive bond 515 at the leading edge 510 of the blade. Because of the suction forces acting on the leading edge 510, displacement of the upper shell section 560a relative to the lower shell section 560b, or vice versa, may occur and would significantly alter the aerodynamic profile of the blade. Thus, it may be desirable to constrain displacement of the upper and lower shell sections to lengthwise, or spanwise, displacement relative to one another, to the extent possible.

The thick adhesive bond is again located below the leading edge 510, near the front stagnation zone 520, so as to minimize the aerodynamic effect of any changes in blade shape near this low shear modulus region. It can also be seen in the illustrated embodiment that one of the shell sections, in this case the high pressure or lower section 560a, comprises an inward jog 505, so that a portion of the upper and lower sections overlaps at the leading edge 510. Because the high-pressure or upper shell section 560a curves through the leading edge and backward, additional resistance to buckling of the upper shell section is provided. Similarly, the inward jog of the lower shell 560b may provide additional buckling resistance for the lower shell section near the joint.

In an alternative to the use of a thick bond layer, a similar effect may be provided by securing a section of joining material having a low shear modulus, such as a rubberized material, between the upper and lower blade shells, using thin layers of adhesive to secure the section in place. Such an embodiment may provide greater control over the properties and size of the low modulus layer than the use of a low shear modulus adhesive, as the section of rubberized material may be precut to a desired size and shape. In particular embodiments, the joining material may have a modulus of rigidity of less than 100 ksi, but materials having a larger or smaller modulus of rigidity may also be used in various embodiments.

In alternate embodiments, the shear stiffness and/or the thickness of the adhesive bond may vary over the length of the blade. In other embodiments, adhesive having a low modulus of rigidity may be applied both along the leading edge and the trailing edge of the blade. To the extent that the aerodynamic properties of the blade may be altered by the inclusion of a thicker bond along an edge, the profile of the upper and/or lower shell sections may be altered to provide a desired aerodynamic profile, such as by utilizing an airfoil similar to that depicted in FIGS. 5A-5D, for example.

Figure 9:
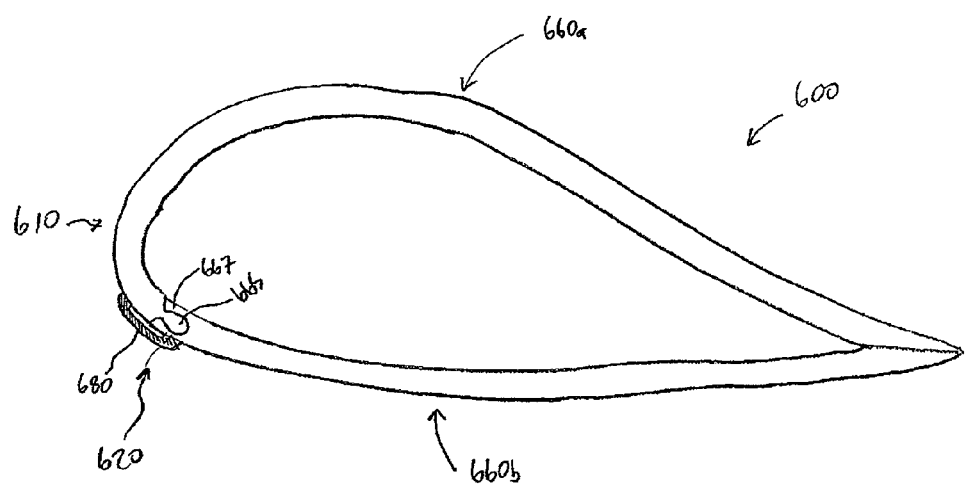
FIG. 9 is a cross-sectional view of an embodiment of a wind turbine blade having a slip joint between the upper and lower shell along the leading edge of the blade, taken at a location between the root region and the tip region of the blade.

In yet other embodiments, lengthwise displacement of shell sections relative to one another may be permitted through the use of a slip joint or similar connection joining the two shell sections. The slip joint will advantageously prevent non-lengthwise translation of one of the shell sections relative to one another. FIG. 9 illustrates another embodiment of a blade 600 in which an upper shell section 660a joined to a lower shell section 660b via a rail 665 on the upper section 660a, where the rail 665 is secured within a groove 667 on lower section 660b to form a slip joint between the groove 667 and the rail 665. The slip joint permits some lengthwise translation of upper shell section 660a relative to lower shell section 660b while preventing displacement of the upper shell relative to the lower shell in non-lengthwise directions. For example, the rail 665 is held in blade by the shape of groove 667 preventing separation of the two shell sections or slippage of one of the edges of the shell sections, resulting in compression of the airfoil. Edgewise translation of the leading edge of one section to the leading edge of the other is similarly constrained by the interaction between the rail 665 and the walls of groove 667.

In certain embodiments, additional protection against undesired movement of the shell sections may be provided via a protective member 680 secured to both the upper section 660a and the lower section 660b, and concealing the joint between the rail 665 and the groove 667. The protective member may comprise a fabric or similar material having sufficient tensile strength to prevent the rail 665 from slipping out of the groove 667, but may allow some lengthwise translation of the rail 665 within the groove 667. The protective member 680 may also advantageously provide a smoother aerodynamic profile, by concealing the rail 665 and the groove 667. The slip joint is again located below the leading edge 610 near the front stagnation zone 620 in the illustrated embodiment, so minimize the aerodynamic effects of displacement near the slip joint or of the protective member 680. In other embodiments, a slip joint may be provided at another on the airfoil, such as at the trailing edge of the airfoil.

Various combinations of the above embodiments and methods discussed above are contemplated. It is also to be recognized that, depending on the embodiment, the acts or events of any methods described herein can be performed in other sequences, may be added, merged, or left out altogether (e.g., not all acts or events are necessary for the practice of the methods), unless the text specifically and clearly states otherwise.

While the above detailed description has shown, described, and pointed out novel features as applied to various embodiments, various omissions, substitutions, and changes in the form and details of the device of process illustrated may be made. Some forms that do not provide all of the features and benefits set forth herein may be made, and some features may be used or practiced separately from others.

What is claimed is:

1. A wind turbine blade, comprising:
   a blade shell comprising at least a first shell section, a second shell section, and an intermediate shell section extending between the first shell section and the second shell section;
   a stiffening structure disposed between said first shell section and said second shell section;
   wherein the intermediate shell section comprises a material having a lower modulus of rigidity than the first shell section and the second shell section.

2. The blade of claim 1, wherein the intermediate shell section is configured to reduce the torsional stiffness of the blade shell.

3. The blade of claim 2, wherein the reduction in torsional stiffness increases a twist response of the blade.

4. The blade of claim 1, wherein the intermediate shell section is located at a trailing edge of the blade.

5. The blade of claim 4, wherein the intermediate shell section comprises an additional shell panel extending between the first shell section and the second shell section.

6. The blade of claim 5, wherein the additional shell panel extends along only a portion of the trailing edge.

7. The blade of claim 5, wherein the additional shell panel comprises a substantially flat panel extending in a direction substantially orthogonal to a plane of rotation of the blade.

8. The blade of claim 1, wherein the intermediate shell section is located near a leading edge of the blade.

9. The blade of claim 8, wherein the intermediate shell section is located adjacent the front stagnation zone.

10. The blade of claim 1, wherein the intermediate shell section comprises a layer of joining material having a low modulus of rigidity.

11. The blade of claim 10, wherein the first shell panel comprises an inward jog at the leading edge of the first shell panel, the inward jog configured to lie inward of a leading edge of the second shell panel, wherein the adhesive is disposed between the second shell panel and the inward jog of the first shell panel.

12. The blade of claim 10, wherein the layer of joining material is secured to the first and second shell sections via a thin layer of adhesive.

13. The blade of claim 10, wherein the layer of joining material comprises a rubberized material.

14. The blade of claim 10, wherein the layer of joining material comprises a layer of adhesive having a low modulus of rigidity.

15. The blade of claim 10, wherein the layer of joining material has a modulus of rigidity of less than 100 ksi.

16. A wind turbine blade, comprising:
a blade shell, comprising:
a first shell panel; and
a second shell panel, wherein at least a portion of an edge of said first shell panel is configured to slidably interact with at least a portion of an edge of said second shell panel to reduce the torsional stiffness of the blade shell; and
a stiffening structure disposed between said first shell panel and said second shell panel.

17. The blade of claim 16, wherein said first shell panel comprises a rail disposed along at least part of a leading edge of said first shell panel, wherein said second shell panel comprises a groove disposed along at least part of a leading edge of said second shell panel, and wherein said rail is configured to slidably interact with said groove.

18. The blade of claim 17, additionally comprising a protective member between an exterior surface of said first shell panel and an exterior surface of said second shell panel, wherein the protective member extends over at least a portion of said groove and said rail.

19. The blade of claim 16, wherein said stiffening structure comprises a first spar cap disposed adjacent an interior surface of said first shell panel and a second spar cap disposed adjacent an interior surface of said second shell panel.

20. The blade of claim 19, wherein said stiffening structure further comprises a single shear web extending between said first spar cap and said second spar cap.

* * * * *